United States Patent [19]

Jarchow et al.

[11] 3,947,311

[45] Mar. 30, 1976

[54] METHOD AND APPARATUS FOR CEMENTING IN THE MANUFACTURE OF DOUBLE-PANE INSULATING GLASS UNITS

[75] Inventors: Friedrich G. K. Jarchow, Essen-Bredeney; Dietrich Haensel, Bochum; Willi Hempelmann, Herne; Rainer Sturmath, Hattingen; Hans Ringleben, Essen-Bredeney; Walter Knabel, Munich, all of Germany

[73] Assignees: Friedrich G. K. Jarchow; Hans Ringleben, both of Essen-Bredeney, Germany

[22] Filed: Nov. 20, 1973

[21] Appl. No.: 417,494

[30] Foreign Application Priority Data

Nov. 23, 1972 Germany ............................ 2257377
Feb. 24, 1973 Germany ............................ 2309295

[52] U.S. Cl. ................ 156/357; 156/107; 156/575; 156/578; 193/35 R; 198/282

[51] Int. Cl.² ...................... B32B 31/00; B05B 7/00

[58] Field of Search ............ 156/107, 109, 172, 99, 156/292, 244, 288, 556, 562, 578, 103, 105, 546, 557, 555, 580, 356, 357, 486, 298, 363, 489, 295, 364, 500, 574, 575; 52/172, 616, 352–356; 161/45; 118/408, 411, 412, 322, 324, 313, 314, 315; 65/245; 198/267, 282, 256; 193/35 R, 37, 43, 35 TE

[56] References Cited

UNITED STATES PATENTS

| | | | |
|---|---|---|---|
| 2,014,472 | 9/1935 | French | 118/411 |
| 2,294,472 | 9/1942 | MacKenzie | 118/8 |
| 3,518,137 | 6/1970 | Hamilton | 156/99 |
| 3,616,070 | 10/1971 | Lemelson | 156/446 |
| 3,639,202 | 2/1972 | Simon | 156/62.2 |
| 3,759,771 | 9/1973 | Battersby | 156/109 |

*Primary Examiner*—Douglas J. Drummond
*Assistant Examiner*—Michael W. Ball
*Attorney, Agent, or Firm*—Littlepage, Quaintance, Murphy & Doybns

[57] ABSTRACT

Manufacture of double or plural pane insulating packages by placing panes together with a spacer, thereby leaving an interspace at the periphery into which cement is injected. Two nozzles are used to inject cement into the interspace, starting from a common starting region and working in opposite directions around the periphery to a common terminal point. Conveyors and control systems are provided to mechanize the process.

22 Claims, 33 Drawing Figures

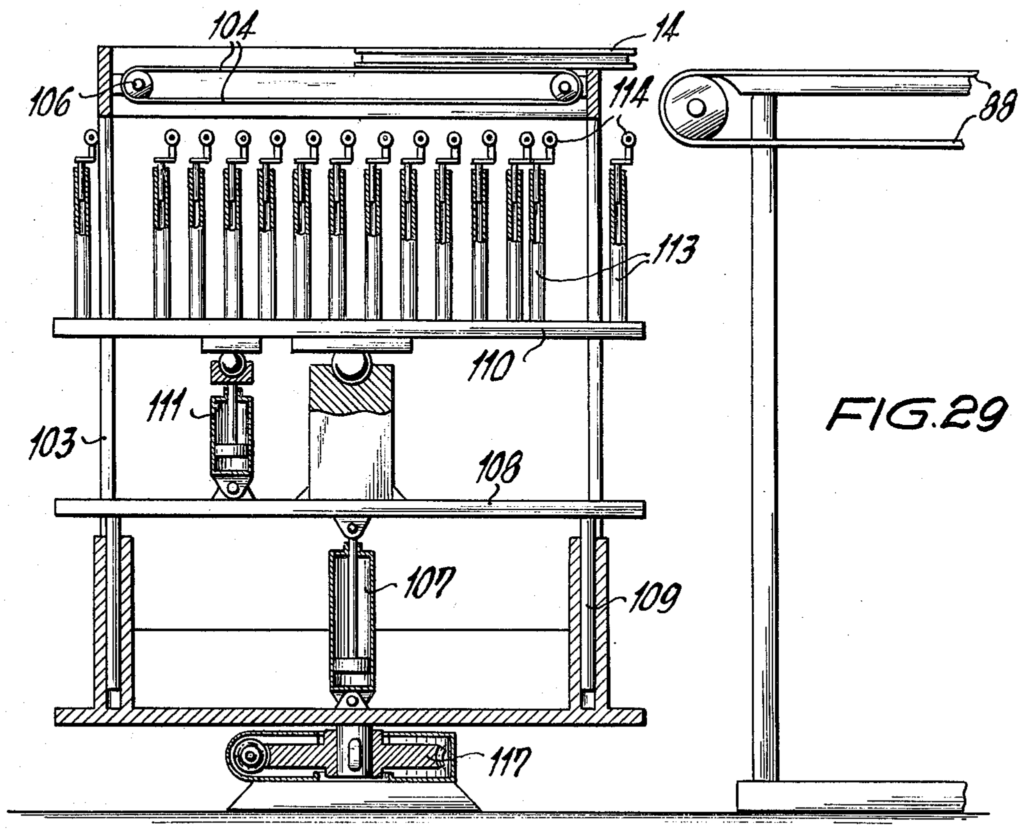
FIG.29
FIG.30
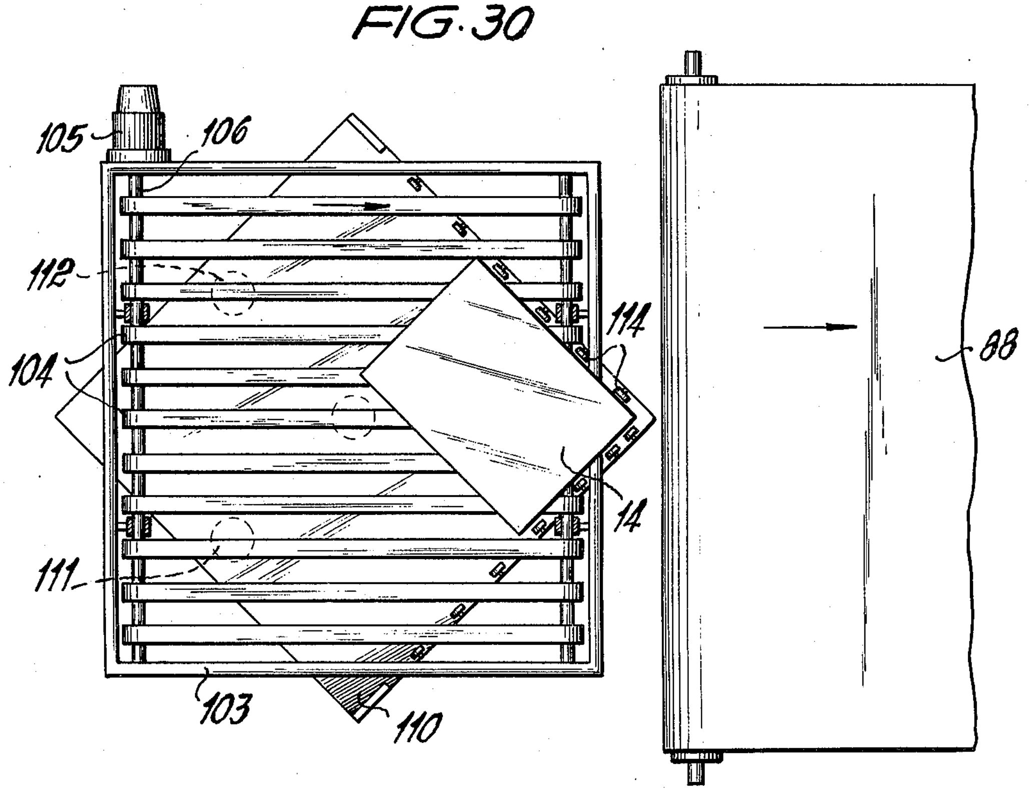

METHOD AND APPARATUS FOR CEMENTING IN THE MANUFACTURE OF DOUBLE-PANE INSULATING GLASS UNITS

BACKGROUND OF THE INVENTION

The invention relates in the first place to a method for cementing in the manufacture of double-pane insulating glass units in which one pane is separated by a framelike spacer from a second pane, and the pane package thus formed is cemented by injecting a cement into an interspace limited by the outside of the spacer and the pane edges projecting beyond the spacer, employing at least two injecting nozzles for the cement.

Double-pane insulating glass is thermally and acoustically insulating. This is due to the air enclosed between the two glass panes and the spacer frame. In the finished double-pane insulating glass, the sides of the panes that face each other are not accessible. In order to avoid a dimming of the panes from the inside, the dew point of the enclosed air is lowered to such an extent that at the usually occurring degrees of coldness the temperature cannot drop below this dew point.

In such double-pane insulating glasses, the initially mentioned air interspace is essentially sealed with relation to the outside. The air is dried by means of a hygroscopic material. This material may be contained in a hollow spacing frame and may act upon the enclosed air through recesses in the spacing frame. Minor leaks of the pane cement can likewise be compensated by this material.

It is known to connect first the spacer with the panes by a cement applied to the sides of the spacer that face the panes, the final pane connection being brought about by a second cement injected into the interspace described which is limited by the outside of the spacer and the pane edges projecting beyond the spacer. These manufacturing processes must predominantly be carried out by hand, permitting therefore only a small degree of mechanization and requiring furnaces for hardening the cement injected into the interspace. Besides, waste may readily be produced in such processes if the panes shift and the cement applied to the frame stains the panes.

Of course, cements have recently been employed which do not require a separate cementing of the spacer with the panes, and which therefore permit a higher degree of mechanization. In particular, prior art does not include thermoplastic cements which connect the panes with the spacer so quickly that special furnaces for hardening the cement are not needed.

Of course, these novel cements, which permit a particularly high degree of mechanization, require the use of extruders, from the nozzles of which the cement is discharged in a hot state, in which process temperatures of about 170°C occur. The cement cools off rapidly. In this instance, it should be noted that the hot cement does not combine with the same cement which has already cooled off. Since the entire interspace cannot be filled with cement all at once, special measures, possibly the application of high pressures, were hitherto required, so as to establish an intimate connection at the boundaries of the first injected cement portions with those injected later. These measures, and especially the application of high pressures, could, of course, hitherto not be carried out in a largely mechanized manufacturing process.

SUMMARY OF THE INVENTION

According to the invention, particular cements are employed which combine with each other only at high temperatures and/or pressures. The invention is not restricted to doublepane insulating glasses. It also includes units wherein more than two panes and, if necessary, more than one spacer are required.

The invention has as an object injecting the cement in such a manner that the cement portions first injected combine with those injected later without employment of additional devices such as a subsequent heating of the panes at the joints of the cement portions and/or high pressures in order to achieve a sufficient connection of all cement portions.

According to the invention, this problem is solved in the method initially indicated by using at least two injection nozzles for the cement and by starting and finishing the injecting process in both injecting nozzles, departing from a starting point, and guiding the injecting nozzles in opposite directions along the periphery of the pane package to a terminal point.

Particularly the procedure is such that the starting point is located between two corners of the pane package, and the terminal point likewise between two corners at a front side.

By these procedures, an intimate connection of these cement portions is produced at the joints of the cement portions extruded by the two injecting nozzles, so that as a result a complete sealing of the air space between the two glass panes and the spacer is accomplished.

According to a further characteristic of the invention, the method indicated is developed further by the device of starting the injection processes of the two injecting nozzles simultaneously. In this case, the cement is accordingly discharged simultaneously from the injecting nozzles, so that the injection of the cement begins and ends at about the same time at the two injecting nozzles.

A simplification of the method of the invention can be achieved by imparting to the injecting nozzles a common starting and terminal point.

On the other hand, starting and terminal points of the injecting nozzles may be located at a short distance from each other if the injecting processes of the injecting nozzles start or stop in brief succession, in which case the injecting nozzle which starts and finishes last sprays the area between the starting or terminal points with cement in an at least partially overlapping manner. Since in this method the injection process of the two injecting nozzles begins and ends at about the same time, an intimate connection of the cement portions extruded by the two injecting nozzles is in this case also achieved and the complete sealing of the air interspace is assured.

The method of the invention can be simplified further by combining the motion of the injecting nozzles with a motion of the pane package. To this end, the invention provides a procedure according to which the motion of the two injection nozzles is interrupted after the start and after the injecting nozzles have reached the pane corners, and the pane package is advanced along the injecting nozzles until each of the two injecting nozzles has reached a further corner, whereafter the pane package is stopped and the injecting nozzles are again set in motion until they reach the terminal point. Especially in this modification of the method of the invention, the nozzle guides can be simplified.

The method of the invention presents the advantage that all portions of the cement are satisfactorily connected without the necessity of further measures. This results in substantial simplifications in the plants in which the double-pane insulating glass units described are manufactured.

With this method it is also possible to process panes with surfaces of different sizes, different pane thicknesses and distances, and with angular as well as rounded-off shapes.

In the cementing of panes with rounded-off corners, the transversal and longitudinal motions of the nozzles and/or the pane package can be combined.

A cement is now available which presents particularly favorable physical properties as a connector of glass panes and which can be injected in a viscous state at about 180°C by an extruder of an injection molding machine. It cools off relatively fast and assumes in this process the final necessary physical properties, without presenting the tendency to drip when being processed. Before the application of the first layer ("primer") the gaps must be heated. The subsequent spraying of a protective layer (latexing) on the cement is recommended. With this cement, however, it should also be noted that hot cement does not combine with one that has already cooled off.

In a further embodiment of the method of the invention, the procedure is such that the pane packages form on conveyers arranged in series, especially on conveyer belts, while resting on their sides, an angle of 45° relative to the direction of conveyance, and that the nozzles, arranged in each case between two conveyers, move along straight lines perpendicular to the direction of conveyance of the pane packages in such a way that they start injecting simultaneously at one corner of the pane package and stop injecting simultaneously at the diagonally opposite corner.

However, there are so far no devices yet which permit such automatic manufacturing processes.

The invention therefore also has as an object producing devices for manufacturing multi-pane insulating glass, preferably with rectangular or square panes, which permit the use of the method of the invention. Especially, the object is to pretreat automatically the gaps of the pane packages with hot-air nozzles and liquid spraying nozzles and to inject, with cement-spraying nozzles, the cement into the gaps, then to retreat the cement connection with liquid spraying nozzles.

According to the invention, pressure rollers, preferably actuated hydraulically or pneumatically, press the pane packages against the conveyers when the nozzles are in operation.

The further development of the invention presents the following characteristics:

The conveyor belts slide over sliding boards. They are temperature-resistant in a known manner and present a high coefficient of friction on the outside and a relatively low one on the inside.

The cement-injecting nozzles are movable with relation to their machines. That is, in the present case they are rotatable about an axis perpendicular to the pane surface and passing through the nozzle opening, as well as being adjustable perpendicularly to the direction of conveyance of the pane packages, and furthermore being displaceable in height.

The cement-injecting nozzles inject the cement preferably in a direction perpendicular to the gaps of the pane packages.

The machines for the cement are preferably displaceable on rolls.

Elastic hoses for guiding the cement connect the cement-injecting nozzles with their machines.

Alternately, flexibly connected pipes for guiding the cement may connect the cement-injecting nozzles with their machines.

The hoses or pipes for guiding the cement, and the cement-injecting nozzles are heated.

The cement-injecting nozzles are provided with replaceable nozzle orifices which are provided with guiding surfaces for the pane edges.

The nozzle orifices of the cement-injecting nozzles have guide surfaces which are ball-shaped in width.

The machines to be used for the cement are preferably injection-molding machines.

The hot-air nozzles and liquid-spraying nozzles are movable relative to their accessories. That is to say, they are movable perpendicularly to the direction of conveyance of the pane packages, and are adjustable in height.

The accessories for the hot-air nozzles and liquid-spraying nozzles are in each case arranged on a frame which preferably runs on rolls.

Elastic hoses or flexibly connected pipes for guiding the hot air or the spraying liquid connect hot-air nozzles and liquid-spraying nozzles with their respective accessories.

Alternately, hot-air nozzles and liquid-spraying nozzles form a unit with their respective accessories and are in each case perpendicular to the direction of conveyance of the pane packages and are displaceable in height relative to their respective frame which runs preferably on rolls.

Preferably rolls with roll bodies lead the hot-air and liquid-spraying nozzles along the pane edges.

A combined hot-air and liquid-spraying nozzle consisting of four individual nozzles injects, in the sequence of the motions, first hot air, and then, immediately afterwards, spraying liquid vertically into the gaps of the pane packages. In this process two individual nozzles are alternately in operation and the changeover takes place on the pane corners.

Alternately, heating radiators may be employed instead of hot-air nozzles.

Soft springs press the guiding surfaces of the orifices of the cement-injecting nozzles and also press the guide rollers of the hot-air and liquid-spraying nozzles against the pane edges. In this process, the deflections of the springs serve as input signals in a known manner for an automatic sequential control of the machines or frames.

The delivery apparatus for the pane packages is provided with a board pivotable about two axes perpendicular to each other, with eccentric rolls movable in all directions, and with limiting rolls mounted on ball bearings at two sides, in such an arrangement that the rolls can be guided between conveyer belts arranged parallel to each other in a frame. Furthermore the rolls can bring the pane package, by means of gravity, into a prespecified position, and finally can lower the pane package onto the parallel conveyer belts which then carry out the delivery of the pane package to the conveyer. In this process, the sides of the pane package form an angle of 45° with respect to the direction of conveyance.

The delivery apparatus can be turned by means of a pivoting driver preferably by an angle of 45°.

The cement unit is connected with a line which consists of two opposite vertical washing machines as well as several opposite roller trains for vertical guidance, for testing or removing or buffing the panes. The line also consists of vertically operating devices for assembling and pressing the pane package, and furthermore consists of a connection turning apparatus for delivering the pane package to the cementing unit by means of a delivery apparatus.

The present invention offers essentially the following advantages:

Cemented multi-pane insulating glass can now be manufactured in an automatic manufacturing process.

The difficult problem, on the one hand, of always conveniently approaching the gaps of the pane package with the nozzles in the cases of surfaces of different sizes and, on the other hand, of avoiding the collision of hot and cold cement is solved in a surprisingly simple manner according to the invention.

The boards of the conveyer belts advantageously take care of planar support for the pane packages which, due to the high friction coefficients, do not slide. When the cement is being injected and forces are thereby produced, the pressure rollers support the adherence advantageously.

The separation of the nozzles from the movable machines or frames leads to minor acceleration and inertia forces at the pane edges which are thus spared. The turning of the cement-injecting nozzles permits here, for the first time, injection of the cement perpendicularly to the gaps. The height adjustment permits the processing panes of different thicknesses and pane packages which are differently spaced.

The rollers on which the machines or frames run require smaller pushing forces.

Flexibly connected pipes in comparison to elastic hoses for guiding the cement are likely to yield smaller restoring forces.

The heating for the hoses or pipes and the cement-injecting nozzles keeps the cement up to the nozzle orifice at its necessary temperature.

In the case of wear, replaceable nozzle orifices reduce the maintenance costs.

Nozzle orifices which are ball-shaped in width avoid advantageously an edge support with inadmissibly high surface pressure if during the entry the sides of the pane package do not form an exact angle of 45° relative to the direction of conveyance of the conveyer belts.

The injection-molding machines which are preferably employed can press the cement in a viscous state with advantageously relatively high injection pressure through the nozzle openings.

The use of hot air and spray liquid nozzles in the manner described lead to relatively inexpensive devices.

Especially, combined hot-air and liquid-spraying nozzles are mentioned to shorten advantageously the time from the heating to the injection of the cement and, furthermore, to eliminate need for a conveyer belt.

The soft springs which press the nozzles keep the contact pressures relatively low. By means of their deflections, they produce the input signals of the sequence control for the movable machines or frames.

The delivery apparatus can be manufactured at relatively small cost and advantageously utilizes gravity in the positioning of the pane packages.

The assembly line described, with which the cement unit with delivery apparatus is connected, offers the necessary conditions for a fully automatic sequence of the multi-pane insulating glass manufacture.

The turning of the delivery station by 45° results in parallel manufacturing flow and may therefore offer advantages with respect to space.

BRIEF DESCRIPTION OF THE DRAWINGS

In the following, embodiments of the invention are explained in greater detail.

As embodiments there are shown in

FIGS. 29 and 30 illustrate a conveyor system;

DESCRIPTION OF THE PREFERRED EMBODIMENTS

Figure 1:
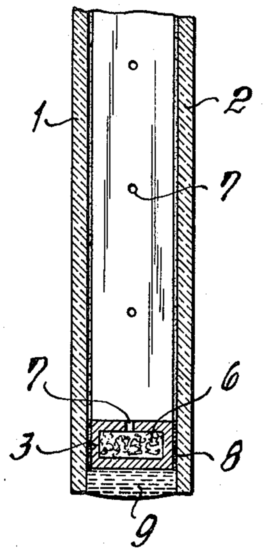
FIG. 1, a section.

Between panes 1 and 2, a spacing frame 3 is provided. It consists of metal hollow-section rods 4 which constitute, together with angular elements 5, the frame 3. The air-drying means 6, which is present in the interior of rods 4, provides dry air between the panes. For this purpose small openings 7 are provided. Angular elements 5 and rods 4 are welded together. The surfaces of the frame facing the panes are coated with a suitable cement 8. This cement has the following functions:

Panes 1 and 2 and frame 3 may be joined together in an orderly manner in a suitable assembling apparatus. In the assembling apparatus, the pane package stands in a vertical position. After the removal of the pane package, the further operations take place with the pane package in a horizontal position. Cement 8 by then already seals against air discharge, due to the overlapping of the upper pane. In a vertical position, the bulging which has occurred can therefore recede. After the passing through a press with horizontal rollers, cement 8 extends over the whole frame width and thus protects even more efficiently against air or water vapor entry. Cement 8 joins the pane package together in a preliminary manner.

The definite connection is brought about by means of cement 9 which must present a sufficient cementing and sealing effect and must furthermore be resistant to external influences. As a rule, the gaps must be sprayed previously with a suitable liquid (primer), in order to establish the bonding between cement and glass.

Hitherto, a cement has generally been employed which, in the cold viscous state, is manually injected by means of spray guns into the gaps. Even when a drying furnace is employed, such a cement disadvantageously requires a relatively long hardening period.

Figure 4:
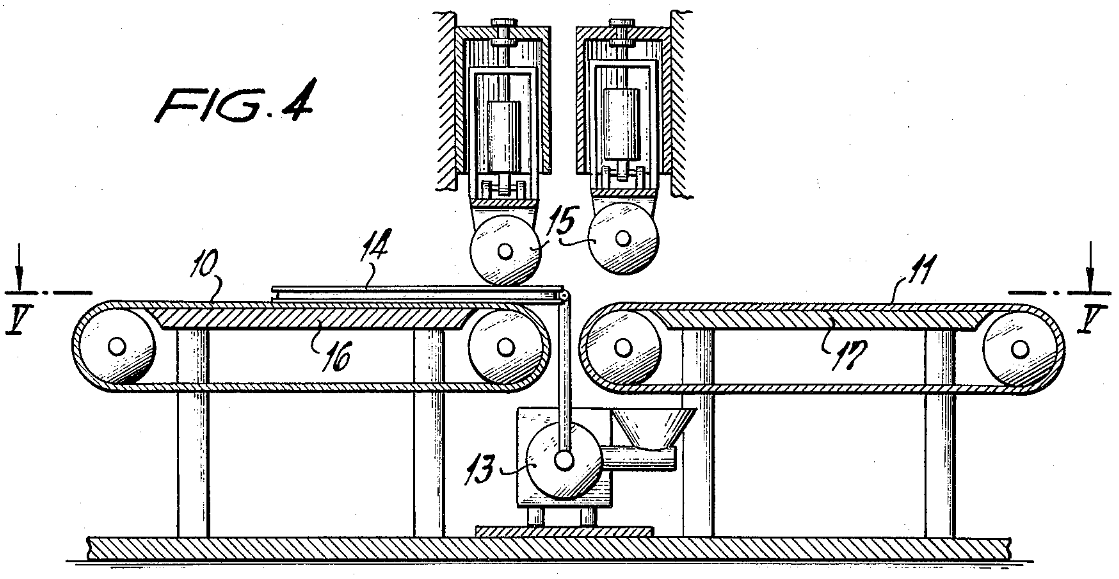
FIGS. 4 and 5 illustrate injection molding machine.
Figure 5:
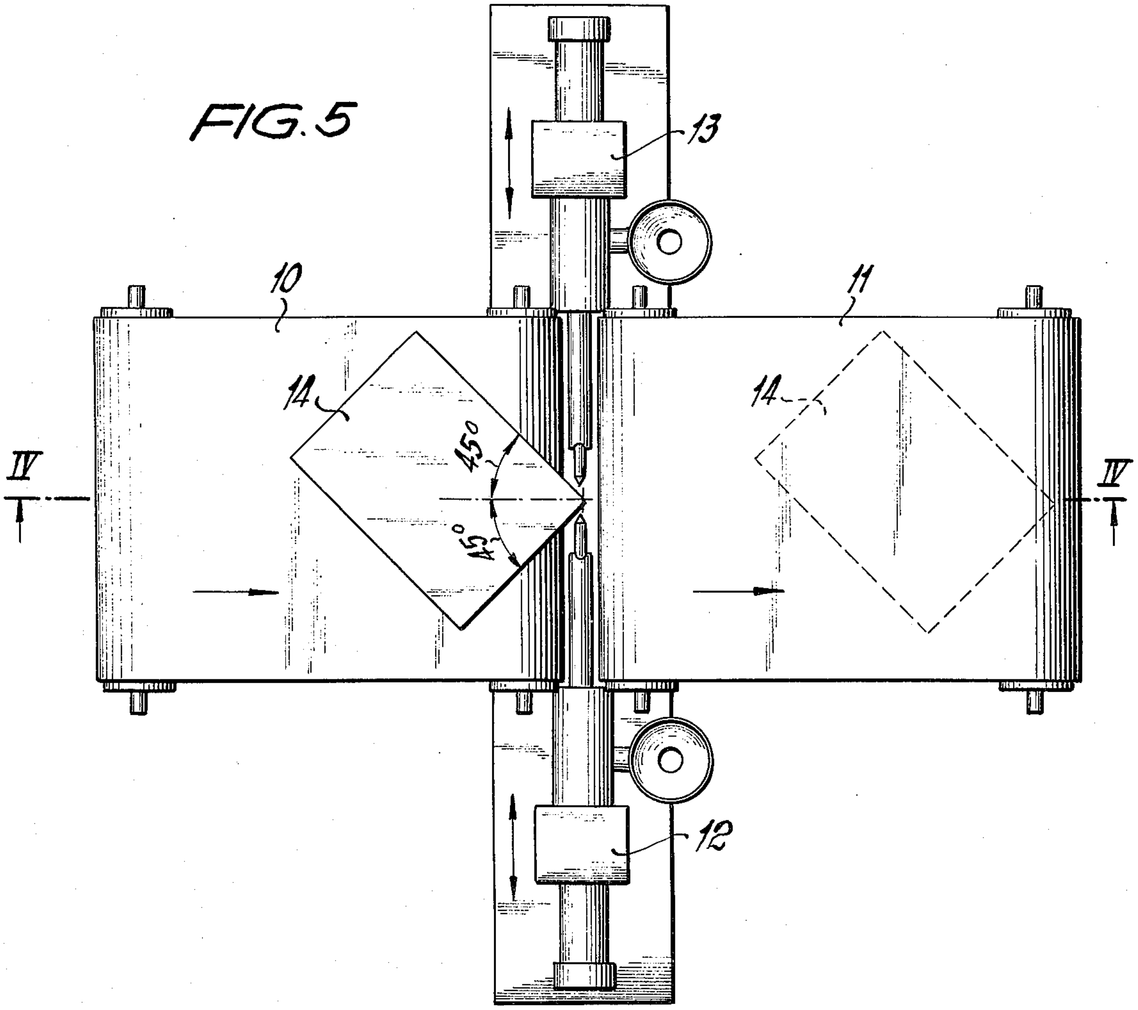

According to the diagrammatical illustrations in FIGS. 4 and 5, injection molding machines 12 and 13 run between conveyer belts 10 and 11. The arrows indicate the directions of motion The sides of pane package 14 intersect the line of direction of conveyance of the conveyer belts at an angle of 45°. In the illustrated position, the injecting process begins. Pressure rollers 15 provide for sufficient adherence of the pane packages to the conveyer belts which slide over boards 16 and 17.

Figure 6:
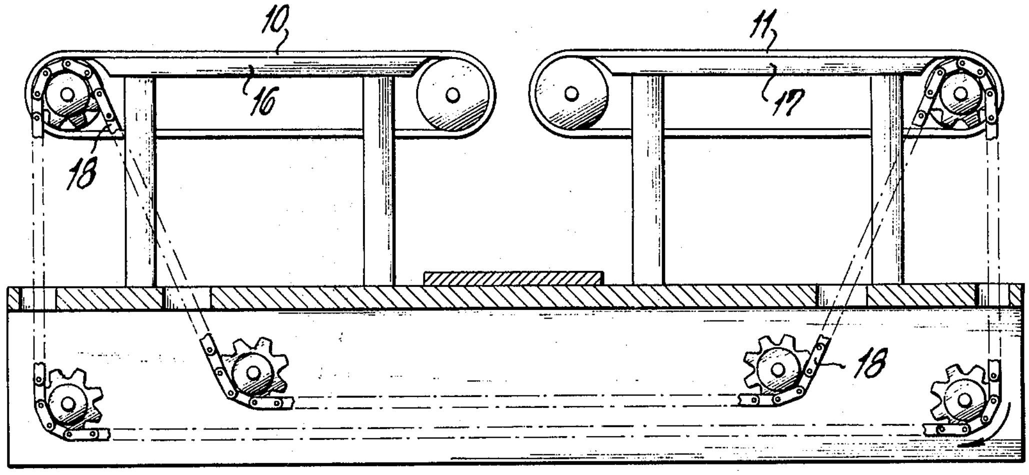
FIG. 6 illustrates a chain-drive for the machines of FIGS. 4 and 5.
Figure 7:
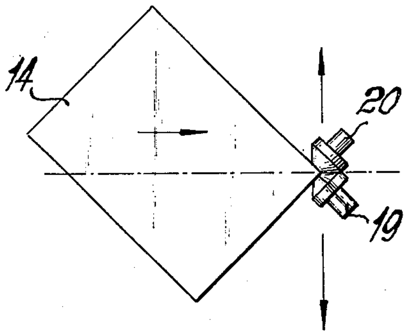
FIGS. 7 through 11 illustrate sequential positions of nozzles when the invention is practiced.
Figure 8:
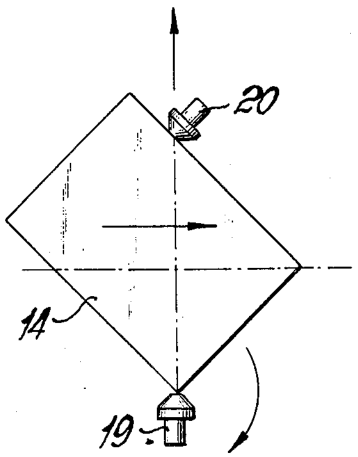
Figure 9:
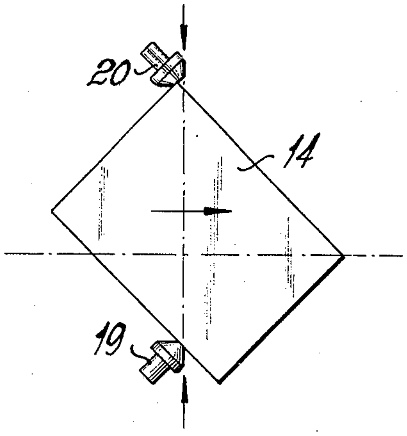
Figure 10:
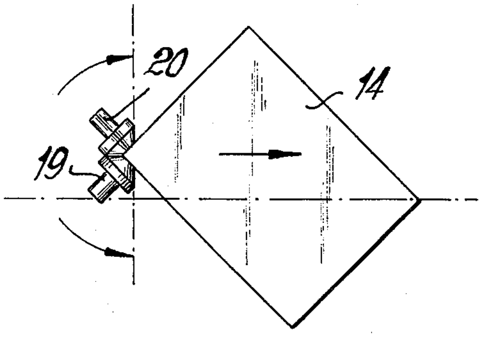
Figure 11:
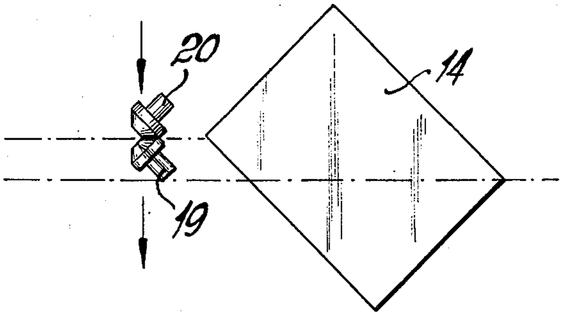

According to FIG. 6, a chain drive with a chain 18 brings about the synchronous running of conveyers 10 and 11.

Figure 2:
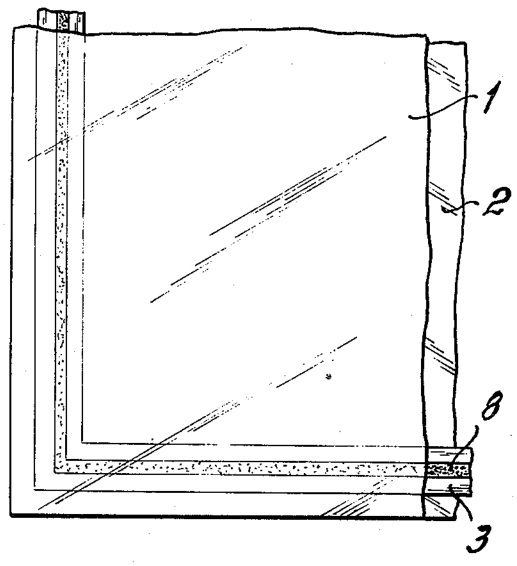
FIG. 2, a view.
Figure 3:
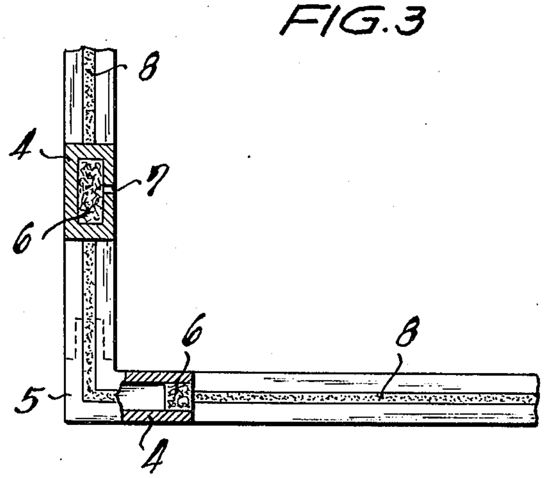
FIG. 3, a spacing frame of cemented multi-plane insulating glass.

FIGS. 7 to 11 show, in the manner of a movie film, various positions of cement-injecting nozzles 19 and 20, from the cementing start to the cementing end of rectangular pane package 14. According to FIG. 11, cement-injecting nozzles 19 and 20 are no longer in the initial position. An automatic control takes care that the injection molding machines with cement-injecting nozzles 19 and 20 travel to the initial position, and that the cement-injecting nozzles, in addition, be precisely fitted in this initial position. FIG. 2 shows this initial position for the cementing of a new pane package 21 of other dimensions.

Figure 13:
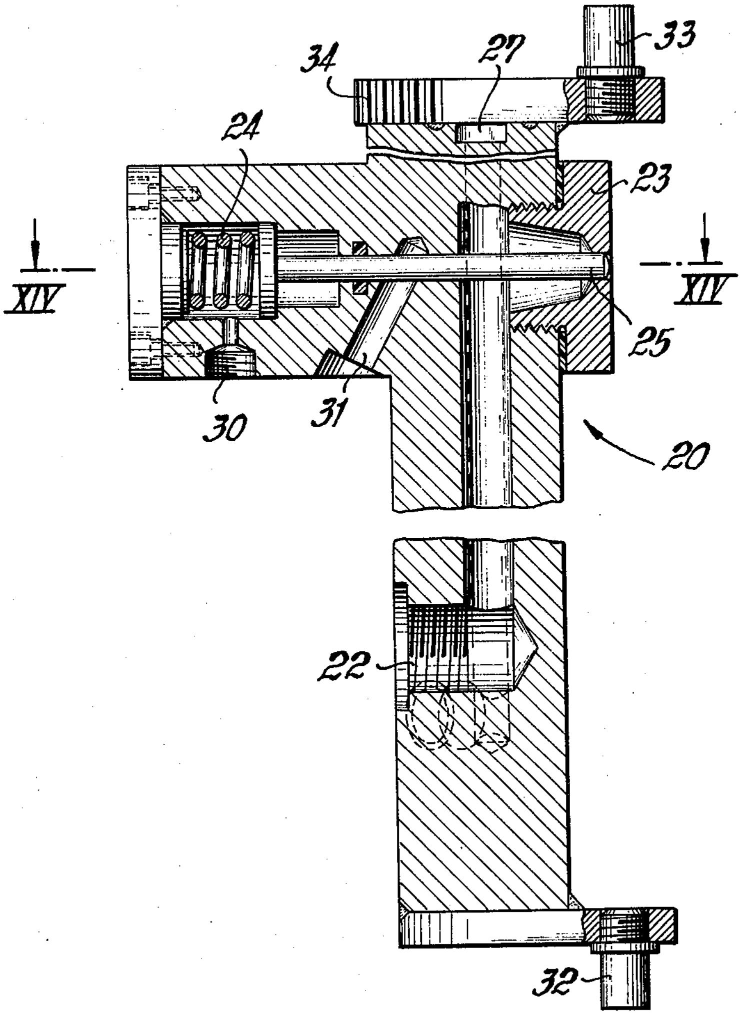
FIGS. 13 and 14 illustrate a cement-injecting nozzle in sections.
Figure 14:
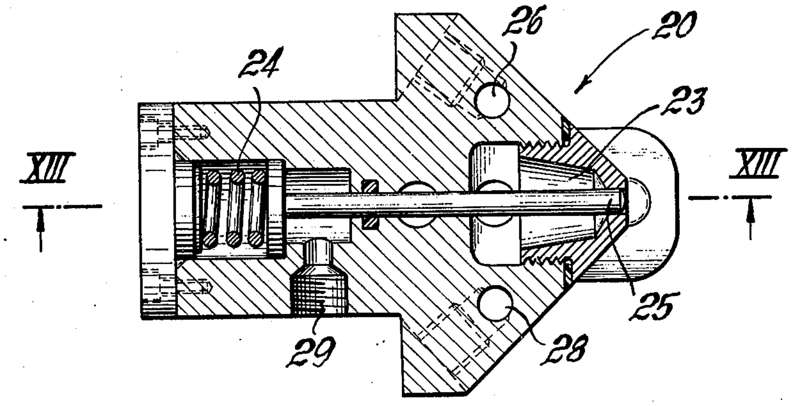

FIGS. 13 and 14 show the cement-injecting nozzle 20 in sections. The viscous hot cement passes through an opening 22 into the replaceable nozzle orifice element 23, whose opening is closed by a piston 25 loaded by a spring 24. Hot oil which flows into opening 26, then is further conveyed through a transversal slot 27 and discharged via an opening 28 to heat the nozzle and thereby the cement to the required temperature. Pressure oil, fed through an opening 29, pushes piston 25 back against spring 24, whereby the hole in nozzle orifice element 23 opens and the injecting starts. Openings 30 and 31 serve to discharge waste oil. The pivot with pins 32 and 33 is positioned in the guide plane of nozzle orifice element 23. A toothed segment 34 serves for the transmission of the rotary motion.

Figure 15:
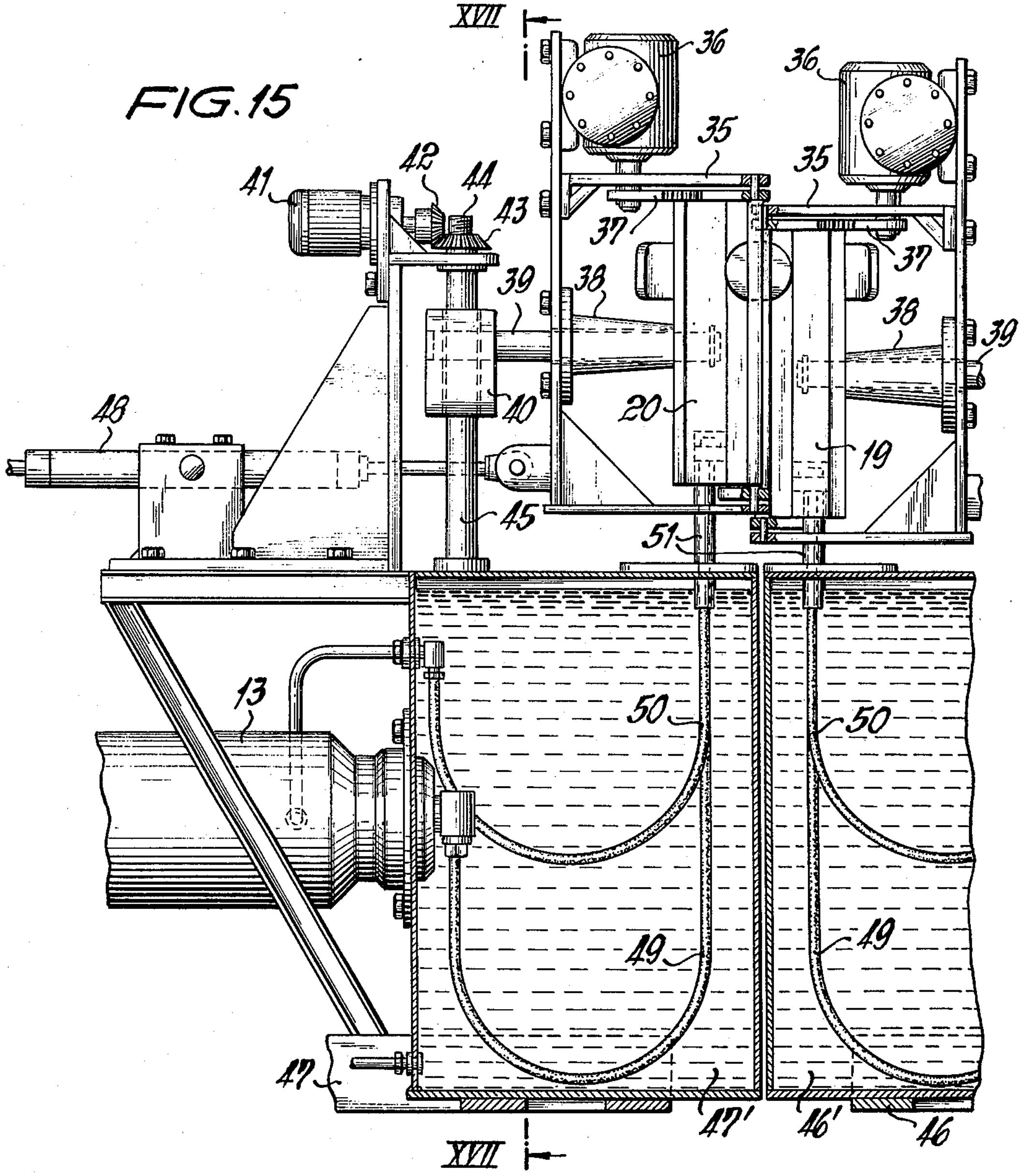
FIGS. 15, 16 and 17 provide respectively a side view, a top view, and a section of a machine with built-in injecting nozzles.
Figure 16:
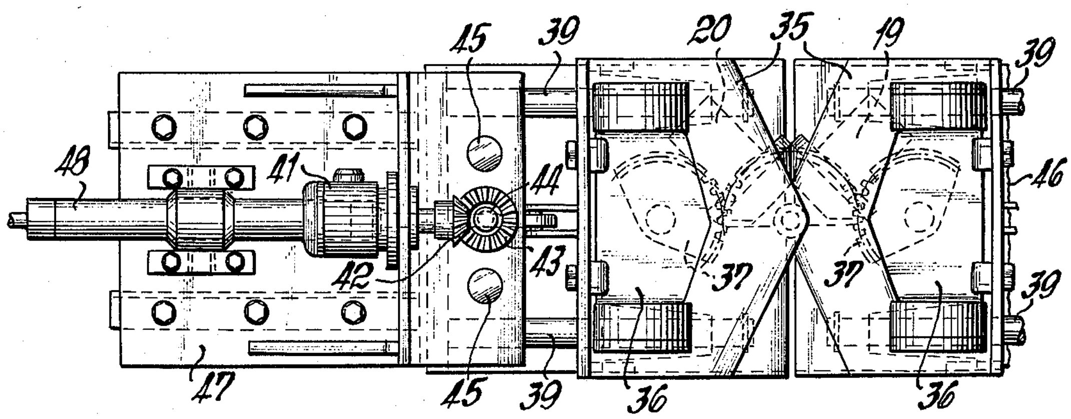
Figure 17:
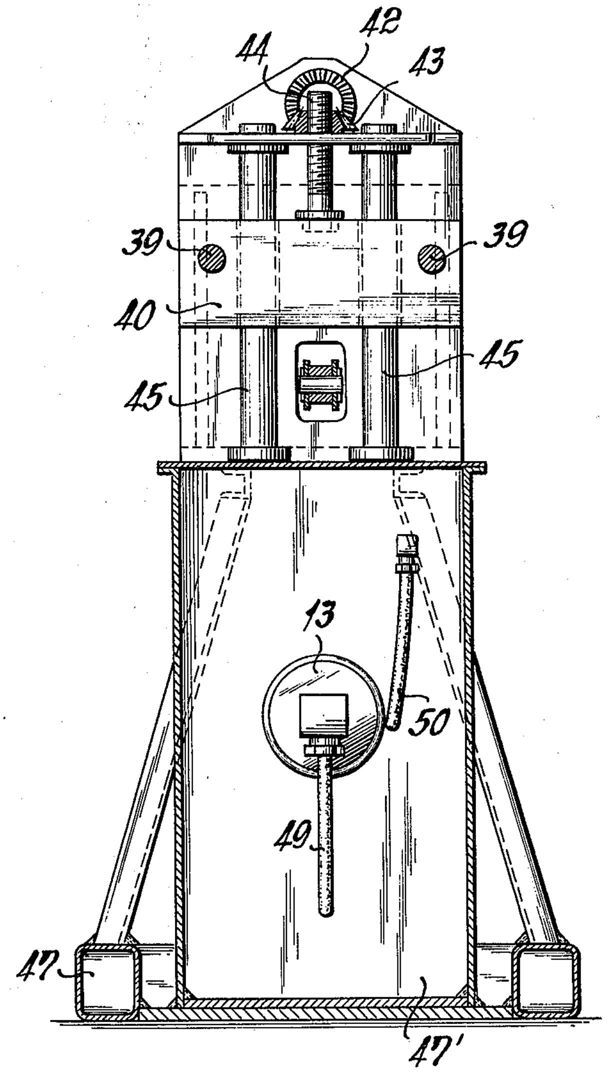

FIGS. 15 and 16 show the built-in cement-injecting nozzles 19 and 20. Section XVII, indicated in FIG. 15, is illustrated in FIG. 17. The pins of the cement-injecting nozzles are mounted in forks 35. Hydraulic pivot drives 36 screwed to forks 35 can turn the cement-injecting nozzles by means of the toothed segments 37. Fork 35 can be displaced, by way of roll bodies between their guide sleeves 38 and bolts 39 which are mounted in yokes 40, relative to the injection molding molding machines 12 and 13 in the direction of motion of the injection molding machines. Yokes 40 are in turn adjustable in height. This takes place by means of servomotors 40, bevel gears 42 and 43, and spindles 44. Bolts 45 take over the guidance in the direction of height. Servomotors 41 and bolts 45 form a unit with the respective frames 46 and 47 of injection molding machines 12 and 13. Cement-injecting nozzles 19 and 20 or forks 35 are supported by means of hydraulic cylinders 48, a store in the hydraulic circuit bringing about a soft elasticity. Cylinders 48 are rotatably supported on frames 46 and 47 and can thus follow a vertical adjustment of injecting nozzles 19 and 20. Elastic high-pressure hoses 49 provide for the feeding of the hot cement from injection molding machines 12 and 13 to cementinjecting nozzles 19 and 20. Oil of suitably high temperature heats nozzles 19 and 20 and high-pressure hoses 49. The heating oil passes from injection molding machines 12 and 13 through hoses 50 into nozzles 19 and 20, and therefrom through chambers 48 which belongs to frames 46 and 47, and through adjustable heating devices back to injection molding machines 12 and 13. In consideration of the necessary relative motions of hoses 49 and 50, chambers 48 are provided on top with corresponding openings. Pipe connections 51 guide the heating oil from the nozzle outlets to the chamber entries. Pipe connections 51 encase high-pressure hoses 49.

Figure 18:
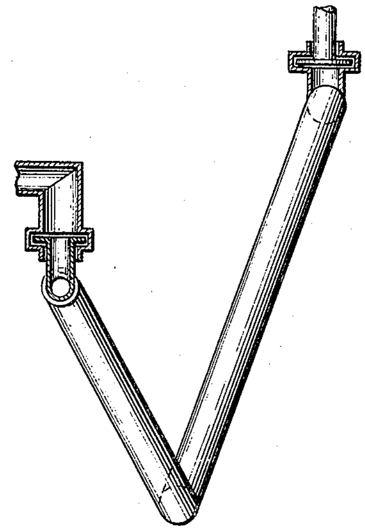
FIGS. 18 and 19 illustrate flexibly connected pipes for use with the nozzles.
Figure 20:
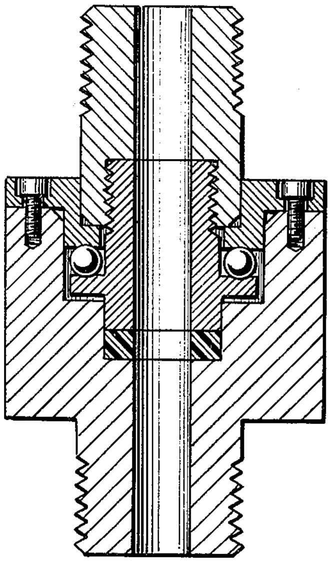
FIG. 20 is a sectional view of a joint in a pipe according to FIGS. 18 and 19.
Figure 19:
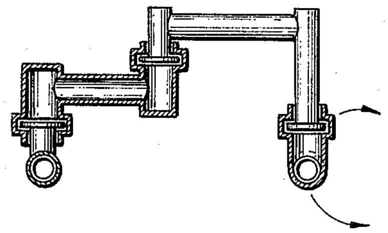

According to the diagrammatical illustrations in FIGS. 18 and 19, flexibly connected pipes can also be employed in place of elastic high-pressure hoses 49. FIG. 20 shows, by way of an example thereof, the embodiment of a suitable joint in a sectional view. It is sealed off against oil entry and cement discharge.

Figure 21:
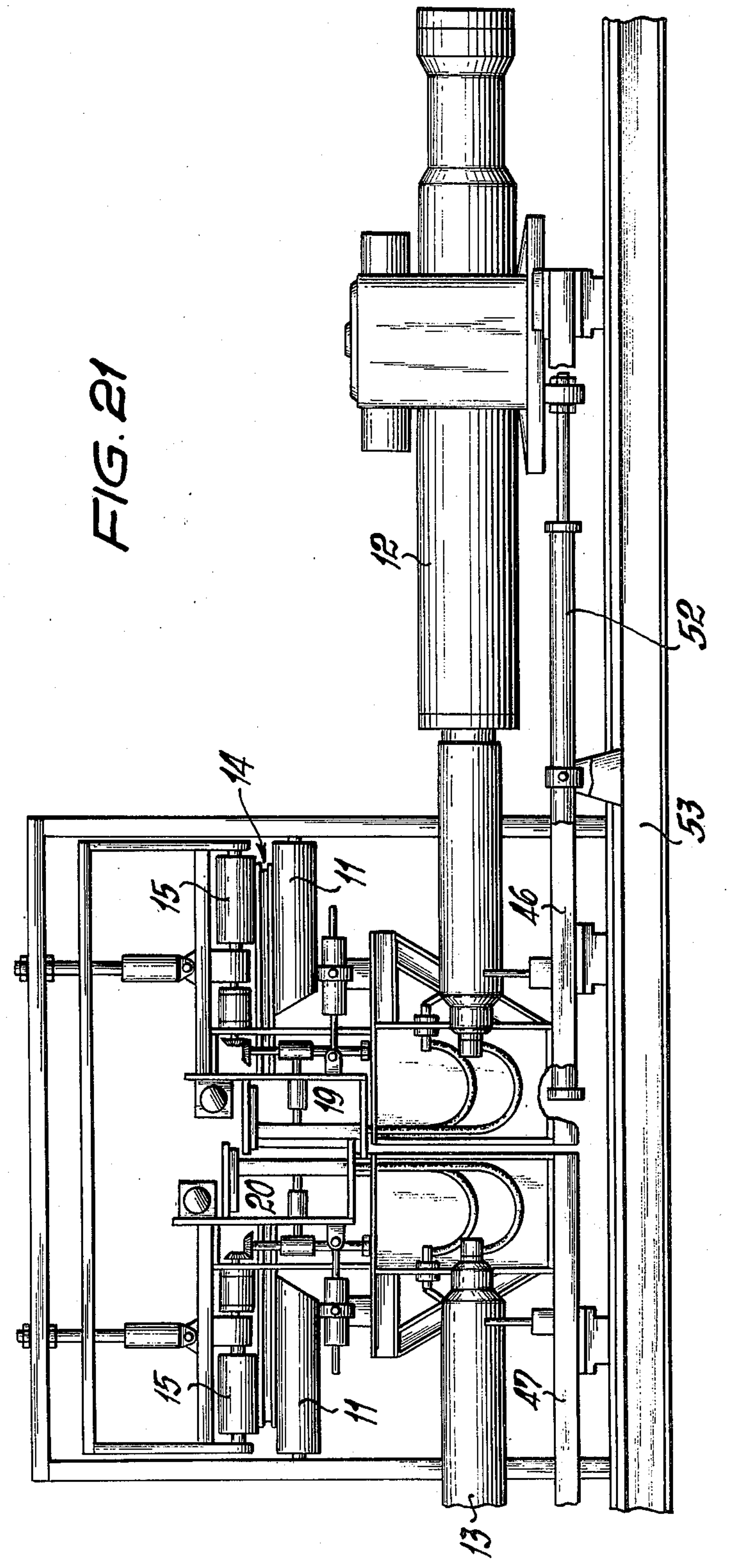

FIG. 21 shows injection molding machines 12 and 13 in connection with cement-injecting nozzles 19 and 20, conveyer belt 11 and pressure rollers 15. The already cemented pane package 14 is positioned on conveyer belt 11. Hydraulic cylinders 52 mounted in frames 46 and 47 adjust injection molding machines 12 and 13 which roll on a frame 53.

Figure 22:
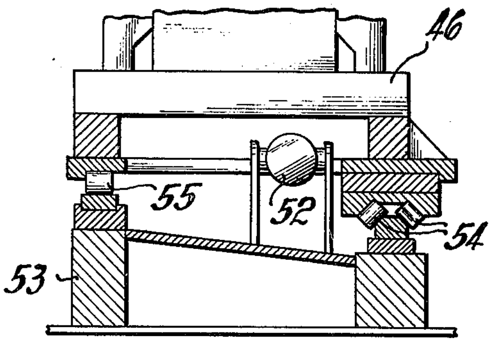
FIGS. 21 and 22 illustrate, in side view and section, an injection molding machine.

The section according to FIG. 22, with frame 46, cylinder 52, frame 53, as well as rollers 54 and 55 with the reverse guides, illustrates the structure.

Figure 23:
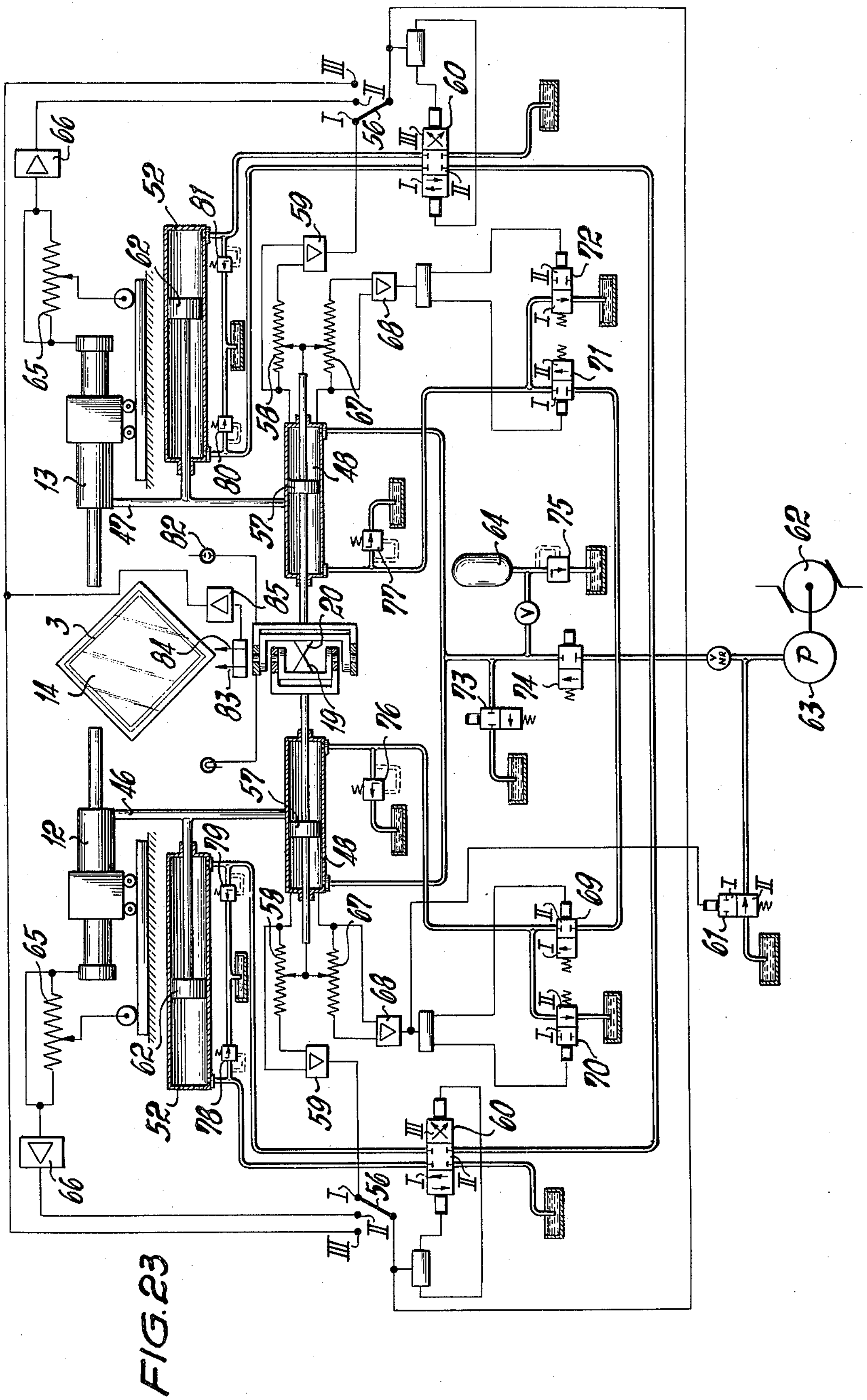
FIG. 23 is a circuit diagram of a system for automatic sequence control of the injection molding machines.

FIG. 23 contains, by way of example, the circuit diagram for the automatic sequence control of the injection molding machines. The sequence control for the hot air and spraying devices takes place in an analogous manner.

When pane package 14 reaches the cement-injecting nozzles 19 and 20, switches 56 are in position I. The motions of cement-injecting nozzles 19 and 20, that is, a piston 57 of cylinders 48 detunes potentiometers 58 with their amplifiers 59, whereby hydro-magnetic valves 60 and 61 are actuated, and thus pistons 62, connected with frames 46 and 47 of injection molding machines 12 and 13 of cylinders 52 are advanced.

When cement-injecting nozzles 19 and 20 move toward the outside, valves 60 and 61 are in position I. A pump 63 driven by an electric motor 62 then advances pistons 62 in such a manner that they likewise run outward with injection molding machines 12 and 13. When, however, cement-injecting nozzles 19 and 20 pass inward, due to the action of a hydrostore 64, pistons 62 are advanced in reverse or a reverse motion of injection molding machines 12 and 13 takes place while valves 60 are in position III and valve 61 in position I.

The necessary turning of cement-injecting nozzles 19 and 20 at the corners of the pane package can be carried out, for example, by nozzle-proof inductive devices in connection with the metal spacing frame of the pane package. Terminal switches may switch the pressure rollers. Adjustable timing circuits are suitable for the adjustments.

At the end of the injection process, a suitable terminal switch mounted on the nozzles causes a shifting of switches 56 from position I to position II, and thus a switching of potentiometers 58 to potentiometers 65 with the corresponding amplifiers 66, which potentiometers are balanced when injection molding machines 12 and 13 have reached their initial position.

The balancing of potentiometers 65, when it has taken place, can be utilized as a signal for switching on potentiometers 67 with amplifiers 68. Detuned potentiometers 67 effect, in connection with hydraulic-magnetic valves 61, 69, 70, 71, and 72, a resetting of nozzles 19 and 20 into the initial position. For a relative displacement in direction with respect to injection molding machine 12, valves 69, 70, 71, and 72 are in position I, and for a relative displacement in direction with respect to injection molding machine 13, they are in position II, in which instance valve 61 is in both cases in switching position I.

After the balancing of potentiometers 65 and 67, hydraulic valves 60, 61, 69 and 70 are in position II, and valves 71 and 72 are in position I.

A magnetic valve 73 permits a discharge, and a magnetic valve 74, in connection with valves 61 and 73, permits a filling of store 64.

Excess-pressure valves 75 to 81 are employed as safety devices.

Before pane package 14 enters the cement-injecting nozzles 19 and 20, a device, such as an optical barrier 82, may put switches 56 into position III and thereby actuate inductive devices 83 and 84 with corresponding amplifiers 85, tuned by the pane package 14 to the upper end of metal frame 3, instead of actuating potentiometers 67. Thus, in the case of detuning, a readjustment of injection molding machines 12 and 13 can be carried out. The balancing, after it has taken place, can be utilized as a signal for the actuation of switches 56, so as to put them into position I. The automatic spraying process for a new pane package can then begin.

Figure 24:
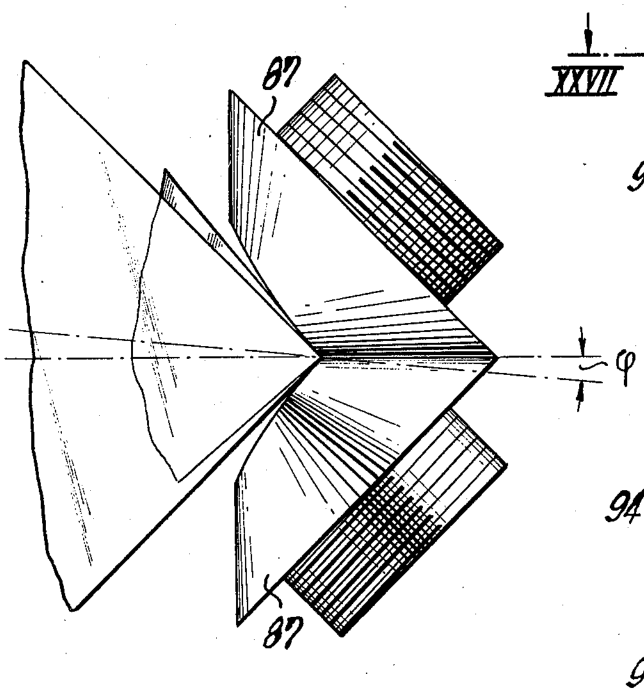
FIG. 24 illustrates the effect of ball-shaped guide surfaces for nozzle orifices.

FIG. 24 demonstrates the effect of the guide surfaces, ball-shaped in width, of nozzle orifices 87. The sides of the pane package deviate in a drawn position by an angle $\phi$ of 45° relative to the direction of conveyance.

Figure 25:
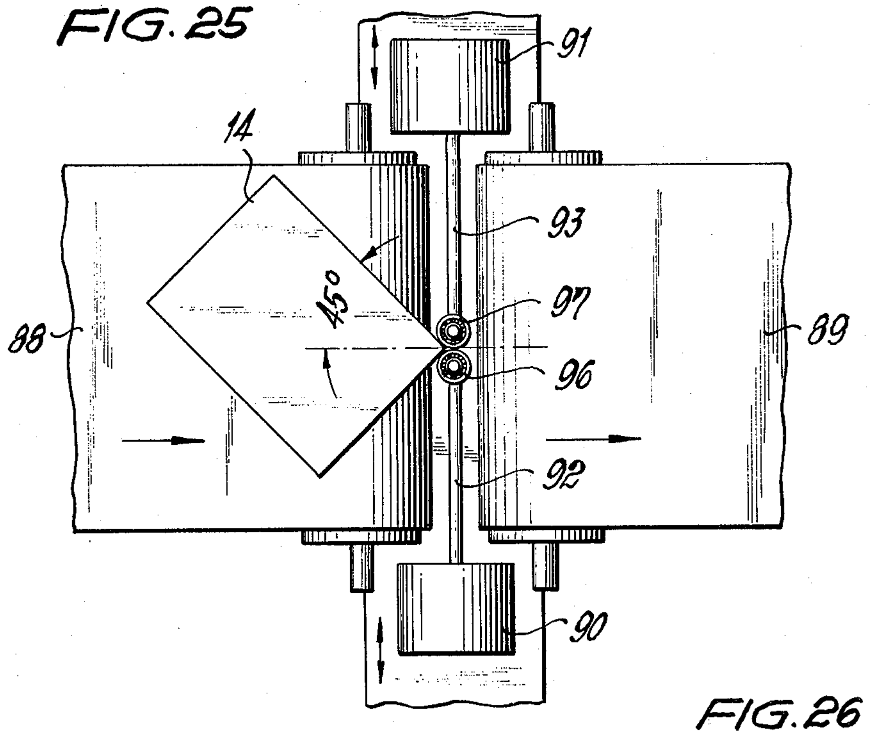
FIGS. 25 through 27 illustrate hot-air nozzles and liquid-spraying nozzles.
Figure 26:
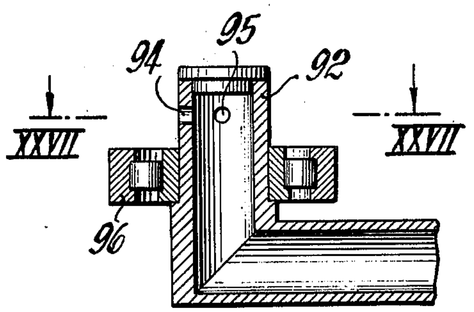
Figure 27:
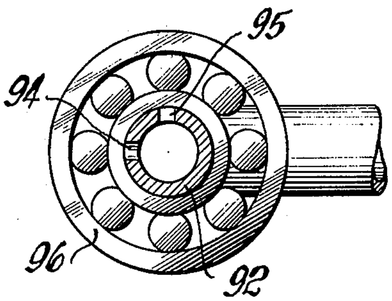

FIGS. 25, 26, and 27 show in diagram hot-air nozzles and liquid-spraying nozzles. Conveyer belts 88 and 89 convey pane package 14 at 45°. Containers 90 and 91 form a unit with respective nozzles 92 and 93, which are shaped as pipes, and they hold, for example, a blower and heating or compressed spraying liquid. They can be displaced perpendicularly to the direction of conveyance of the conveyer belts 88 and 89, with relation to their frames (not shown) movable on rollers, such displacement taking place likewise on rollers. For example, each nozzle is provided with two openings 94 and 95, staggered by 90°, for the passage of the hot air flow. One opening leads in the beginning, the other after passing the following corner, the hot air flowing vertically into the gap of the pane package 14. Rollers 96 and 97 serve as guides.

Figure 28:
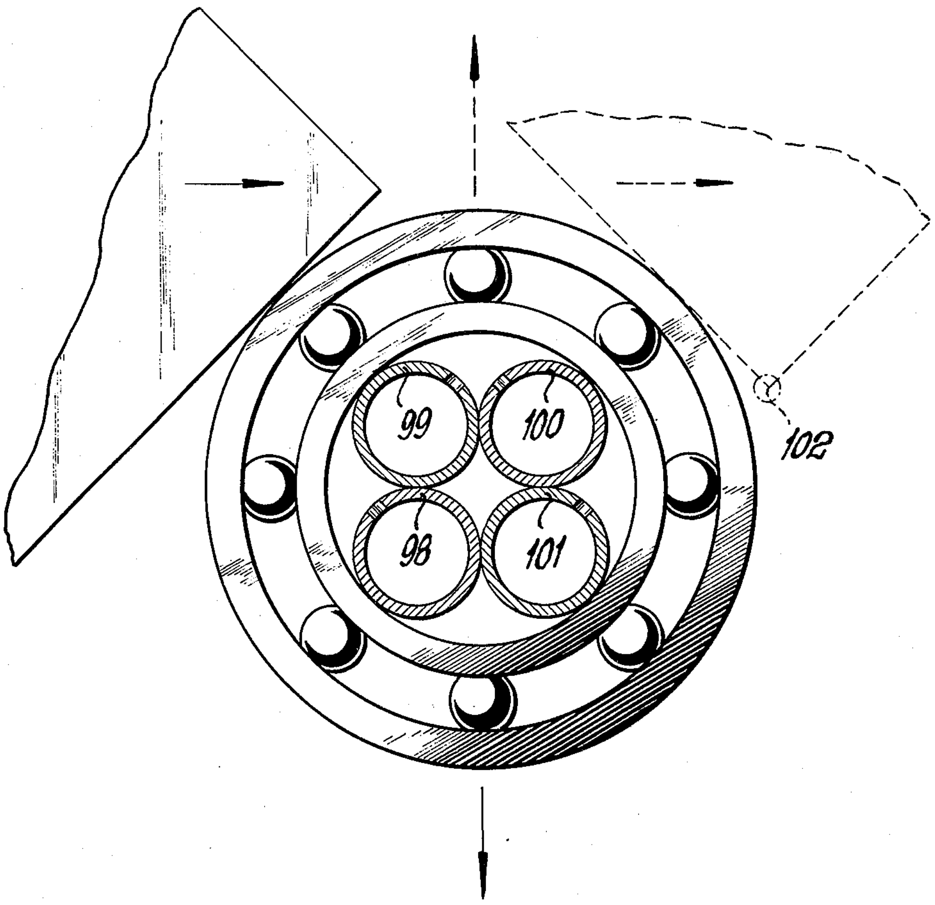
FIG. 28 illustrates a combined hot air and liquid spraying nozzle.

FIG. 28 shows a combined hot-air and liquid spraying nozzle consisting of four individual nozzles. Nozzles 98 and 99 carry hot air, and nozzles 98 and 100 carry spraying liquid. At the beginning, nozzles 98 and 100 are in operation, and after pane corner 102 has been passed, nozzles 99 and 101 are in operation.

FIGS. 29 and 30 show in diagram the delivery apparatus. Conveyer belts 104 are mounted in a frame 103. An adjustable motor 105 drives them by way of a common shaft 106. Conveyer belts 104 and conveyer belt 88 move in the same direction of conveyance, indicated by arrows. A board 108 adjustable in height by means of a hydraulically or pneumatically operated cylinder 107 is guided by bolts 109 in openings of frame 103. A further board 110 on board 108 is supported by ball bearings in its center and is pivotable about shafts, by means of hydraulically or pneumatically operated cylinders 111, 112, which shafts run parallel to the sides of board 110 and pass through the ball center. The sides of square frame 103 and square board 108 cross one another at 45°. Board 108 supports pipes 113 in which universally movable eccentric rollers 114 are supported. When board 108 and thus board 110 are lifted, eccentric rollers 114 pass between conveyer belts 104 upward and form above conveyer belts 108 a roller surface which can be inclined by means of cylinders 111, 112. In this manner pane package 14 enters, due to its gravity, the defined drawn position, in which process rollers supported by ball bearings in rods, which rollers are likewise arranged between conveyer belts 104, constitute the boundary on two sides. By lowering the horizontal roller surface, pane package 14 is placed upon the resting conveyer belts 104, and after the conveyer belts start to be driven by a correspondingly regulated motor 105 at synchronous speed, is placed into the required position, upon conveyer belt 88. Frame 103 can be turned by 45° by means of a pivot drive 117.

Figure 33:
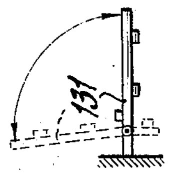
FIG. 33 illustrates a reversing device.
Figure 31:
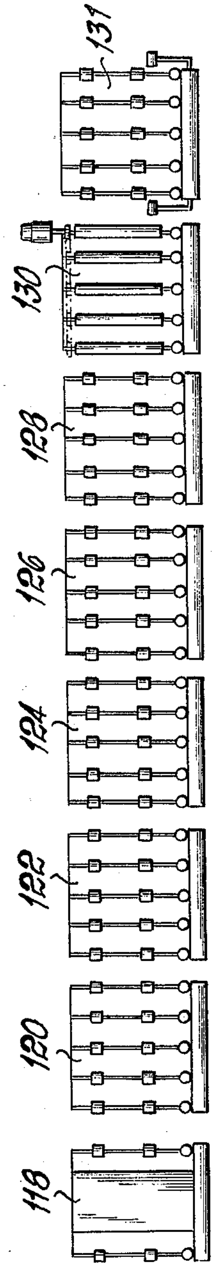
FIGS. 31 and 32 illustrate an assembly or processing line using such conveyors.
Figure 32:
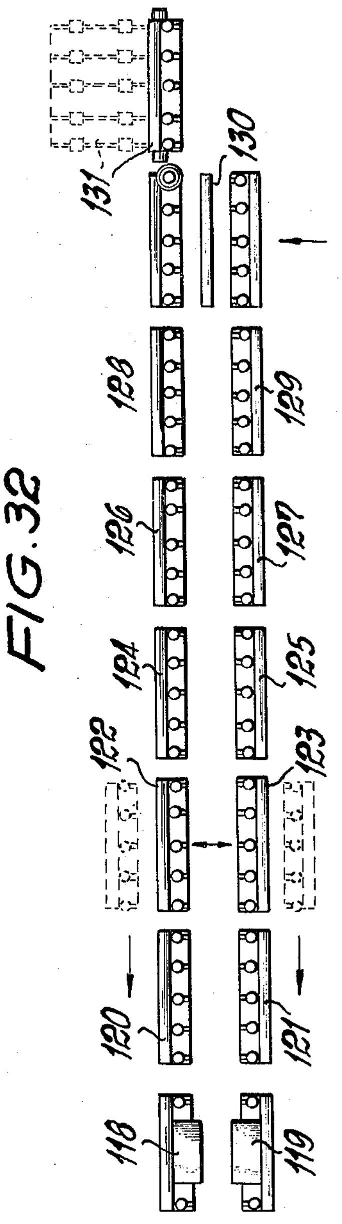

The delivery apparatus is attached to a line which consists, according to FIGS. 31 and 32, of vertically arranged washing machines 118 and 119, roller trains 120 and 121 for testing, roller trains 122 and 123 for removing soiled panes, roller trains 124, 125, 126, 127, 128, and 129 for buffing, as well as of the assembling apparatus with a press 130 and reversing device 131. From reversing device 131, shown in FIG. 33 in side view, the pane package rolls automatically onto the rolling surface of the delivery apparatus.

What is claimed is:

1. In the manufacture of double-pane glass insulating units comprising first and second panes separated by a frame-shaped spacer and formed into a pane package by the injection of a cement into an interspace along the periphery of the pane package, which interspace is limited by the outside of the spacer and edges of the two panes projecting beyond the spacer, the improved apparatus for injecting the cement comprising:

A. a conveyor means for carrying the pane package,

B. pressure roller means for holding the pane package on the conveyor,

C. two nozzle means for injecting cement into the interspace,

D. control means responsive to the presence of the two nozzle means at a common starting region for causing the two nozzles to begin injecting cement into the interspace at said common starting region on the periphery, responsive to the continued proximity of the two nozzles to the interspace to cause the nozzles to continue to inject the cement into the interspace while causing the two nozzles to move in opposite directions along the periphery, and responsive to the presence of the two nozzle means at a common terminal region for causing the nozzles to cease to inject cement into the interspace as the two nozzles reach a common terminal region, and E. means for rotating the nozzles to cause them, while injecting cement, to continue to maintain a constant angular relationship with the periphery of the pane package.

2. Apparatus according to claim 1 wherein the conveyor comprises

A. a conveyor belt arranged to slide over

B. slide boards, the belt being temperature resistant and presenting a high coefficient of friction on the outside and a relatively low coefficient of friction on the inside.

3. Apparatus according to claim 1 wherein the cementinjecting nozzles are mounted to be movable relative to a mounting base, whereby they are rotatable about an axis perpendicular to the surface of the panes and passing through the nozzle orifice, and they are displacable perpendicularly to the direction of conveyance of the conveyor and are adjustable in height.

4. Apparatus according to claim 3 wherein the nozzles inject the cement in a direction perpendicular to the interspaces.

5. Apparatus as in claims 3, wherein the nozzles for the cement are mounted on carriers movable on rollers.

6. Apparatus as in claim 5, wherein the cement-injecting nozzles are supplied with the cement by elastic hoses.

7. Apparatus as in claim 5, wherein the cement-injecting nozzles are supplied with the cement by way of flexibly connected pipes.

8. Apparatus as in claim 7, further comprising means for heating the pipes for guiding the cement and the cement-injecting nozzles.

9. Apparatus as in claim 1, wherein the cement-injecting nozzles are provided with replaceable nozzle orifices which have guiding surfaces for the pane edges.

10. Apparatus as in claim 9, wherein the guiding surfaces are ball-shaped in width.

11. Apparatus as in claim 1, wherein injection molding machines are employed to provide the cement.

12. Apparatus as in claim 1, further comprising both hot-air nozzles and liquid-spraying nozzles movable perpendicularly to the direction of conveyance of the pane packages and adjustable in height.

13. Apparatus as in claim 12, wherein a combined hot-air and liquid-spraying nozzle consisting of four individual nozzles is arranged to inject, in the course of the motion, first hot air and then, immediately following, spraying liquid vertically into the gaps of the pane packages, in which process two individual nozzles are in alternate operation and alternation in said alternate operation takes place at the pane corners.

14. Apparatus as in claim 12, further comprising accessories for the hot air nozzles and liquid-spraying nozzles, which are, in each case, arranged on a frame which runs on rollers.

15. Apparatus as in claim 14, further comprising flexibly connected pipes for the purpose of guiding respectively the hot air and the spray liquid to the hot air nozzles and liquid spraying nozzles with their respective accessories.

16. Apparatus as in claim 15, wherein the hot air nozzles and liquid-spraying nozzles form a unit with their respective accessories and are displaceable in each case perpendicularly to the direction of conveyance of the pane packages, as well as being adjustable in height relative to their respective frame, which runs on rollers.

17. Apparatus as in claim 16, wherein rollers with roll bodies guide the hot air and liquid-spraying nozzles to the pane edges.

18. Apparatus as in claim 1, further comprising heat radiators employed in connection with the liquid-spraying nozzles.

19. Apparatus as in claim 18, characterized in that soft springs press guide surfaces of the nozzle orifices of cement-injecting nozzles and also the guide rollers of the hot air and liquid-spraying nozzles against the pane edges, and further comprising means responsive to the deflections of the springs to provide input signals for an independent sequence control of the machines and frames.

20. Apparatus as in claim 1, with a delivery apparatus for the pane packages, further comprising a board, pivotable about two axes perpendicular to each other and also adjustable in height, provided with universally movable eccentric rollers and boundary rollers supported on two sides by ball bearings, in such an arrangement that the rollers can be passed between conveyer belts, mounted in a frame and parallel to each other, and wherein the rollers can place the pane package, by gravity, into a prespecified position and finally can lower the pane package upon the parallel conveyer belts, which then carry out the delivery of the pane package to the conveyer, in which process the side of the pane package form an angle of 45° relative to the direction of conveyance.

21. Apparatus as in claim 20, wherein the delivery apparatus can be pivoted, preferably by an angle of 45°, by means of a pivot drive.

22. Apparatus as in claim 21, wherein the cement unit is attached to a line which consists of two opposite vertical washing machines, as well as of several opposite roller trains for vertical guidance, for testing, and for removing and buffing the panes, and of vertically operating devices for joining and pressing the pane package, and finally of an attached turning apparatus for delivering the pane to the cement unit by means of a delivery apparatus.

* * * * *

UNITED STATES PATENT AND TRADEMARK OFFICE

CERTIFICATE OF CORRECTION

PATENT NO. : 3,947,311

DATED : March 30, 1976

INVENTOR(S) : JARCHOW ET AL.

Figure 12:
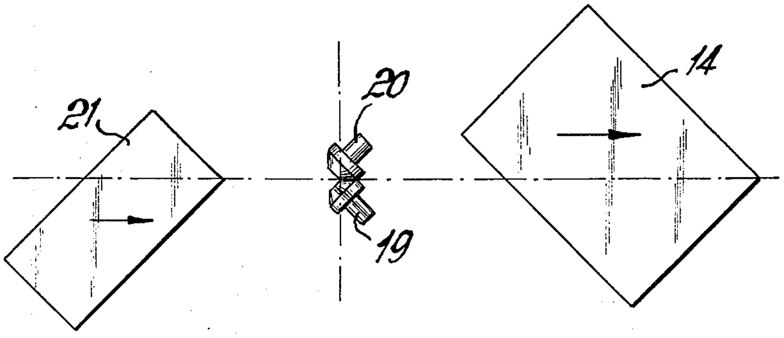
FIG. 12 illustrates an initial position for use with panes of other dimensions.

It is certified that error appears in the above-identified patent and that said Letters Patent are hereby corrected as shown below:

Column 7, Line 42, delete "Fig. 2" and insert -- Fig. 12 --.

Signed and Sealed this

Thirteenth Day of July 1976

[SEAL]

*Attest:*

RUTH C. MASON
*Attesting Officer*

C. MARSHALL DANN
*Commissioner of Patents and Trademarks*